United States Patent Office 3,752,808
Patented Aug. 14, 1973

---

3,752,808
5-IMINO-1,2,4-TRIAZINES AND THEIR PRODUCTION
Manfred Jautelat and Hans-Joachim Kabbe, Leverkusen, and Kurt Ley, Odenthal-Globusch, Germany, assignors to Bayer Aktiengesellschaft, Leverkusen, Germany
No Drawing. Filed Jan. 19, 1971, Ser. No. 107,823
Claims priority, application Germany, Jan. 24, 1970,
P 20 03 144.1
Int. Cl. C07d *55/18*
U.S. Cl. 260—249.5    18 Claims

ABSTRACT OF THE DISCLOSURE

Novel 5-imino-1,2,4-triazine compounds of the formula

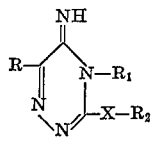

in which

R is an aliphatic, arylaliphatic, aromatic or heterocyclic radical which may be substituted by hydroxy, halogen, alkyl and/or nitro, $R_1$ is an aliphatic hydrocarbon radical, amino, alkylamino or dialkylamino, $R_2$ is hydrogen or an aliphatic hydrocarbon radical, and X is oxygen, sulfur or $NR_3$ where $R_3$ is for hydrogen or an aliphatic hydrocarbon radical, possess outstanding herbicidal, especially selective herbicidal activity, and furthermore are intermediates for the preparation of other herbicidal compounds.

The invention also provides a novel process for making the novel 5-imino-1,2,4-triazine compounds by reacting a corresponding α-iminonitrile with a hydrazine derivative.

---

The present invention relates to novel 5-imino-1,2,4-triazine compounds, to herbicidal compositions containing them, and to their use as herbicides. In different aspect the invention relates to a novel chemical process which can be used to prepare said novel compounds.

The present invention provides 5-imino-1,2,4-triazine derivatives of the general formula

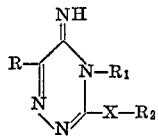  (I)

in which

R is an aliphatic, arylaliphatic, aromatic or heterocyclic radical which may be substituted by hydroxy, halogen, alkyl and/or nitro, $R_1$ is an aliphatic hydrocarbon radical, amino, alkylamino or dialkylamino, $R_2$ is hydrogen or an aliphatic hydrocarbon radical, and X is oxygen, sulfur or $NR_3$ where $R_3$ is for hydrogen or an aliphatic hydrocarbon radical.

$R_1$ is preferably alkyl of from 1–6 carbon atoms or amino, $R_2$ is preferably hydrogen or alkyl of from 1–6 carbon atoms, and X is preferably oxygen or sulfur.

The new 5-imino-1,2,4-triazine derivatives according to the invention are valuable intermediates for the preparation of herbicidal active compounds. By hydrolysis of the imino group, for example by heating with dilute hydrochloric acid, the 5-imino-1,2,4-triazine derivatives can be converted into the appropriate 1,2,4-triazine-5-ones, the herbicidal potency of which is known (cf. Naturwissenschaften 55, 1446 (1968), as well as Japanese patent specification 547,317). For example, 3-mercapto-4-amino-5-imino-6-tert.-butyl-1,2,4-triazine can be hydrolyzed by boiling under reflux for one hour with 1 N hydrochloric acid, with the formation of 3-mercapto-4-amino-6-tert.-butyl-1,2,4-triazine-5-one, which can at 20° C. be methylated with methyl iodide in the presence of sodium hydroxide be converted into 3-methylmercapto-4-amino-6-tert.-butyl-1,2,4-triazine-5-one which is known as a particularly effective herbicide.

The invention accordingly provides intermediates from which known herbicidal compounds can be prepared.

Moreover, the new 5-imino-1,2,4-triazine derivatives according to the invention also exhibit themselves strong herbicidal properties and can therefore be used for the control of weeds. The term "weeds" is used herein in the widest sense to mean all plants which grow in places where they are not desired. Whether the active compounds according to the invention act as total or selective herbicides depends chiefly on the amount used.

The invention also provides a novel process for the production of a compound of Formula I above.

It is known that 1,2,4-triazine-5-one derivatives can be prepared by reaction of α-ketonic acids with hydrazine derivatives (cf. "The Chemistry of Heterocyclic Compounds," A. Weissberger, vol. 10, 44, Interscience Publishers, Inc., New York, 1956). However, since the α-ketonic acids are accessible with difficulty or by multistep syntheses, such as e.g. trimethylpyruvic acid, this process is of only limited importance. It is also known that 5-imino-6-phenyl-1,2,4-triazines which can readily be converted into appropriate 1,2,4-triazine-5-ones by hydrolysis of the imino group are obtained from benzoylcyanides and hydrazines derivatives (see Belgian patent specification 735,318). This method fails, however, when 5-imino-6-alkyl-1,2,4-triazines are to be prepared which have importance as intermediates for the synthesis of 6-alkyl-1,2,4-triazine-5-ones, since the acylcyanides concerned split off preferentially hydrogen cyanide when they are reacted with hydrazine derivatives (cf. Chem. Ber. 88, 117 (1955)).

In the process of this invention the compounds of Formula I are prepared by reacting an α-iminonitrile of the general formula

  (II)

in which

R and $R_4$ may be the same or different and each is defined as R is defined above, with a hydrazine derivative of the general formula

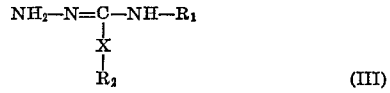  (III)

in which $R_1$, $R_2$ and X are defined as above, in the presence of an organic solvent and in the presence of an acid.

It is very surprising that the α-iminonitriles of Formula II when reacted with hydrazine derivatives of Formula III behave quite differently from the corresponding acylcyanides (that is, α-ketonitriles). Whereas acylcyanides react with hydrazine derivatives with, above all, the splitting off of hydrogen cyanide (cf. Chem. Ber. 88, 117 (1955)), the α-iminonitriles concerned do not lose the nitrile group when reacted with hydrazine derivatives. On the contrary, the 1,2,4-triazine system is formed in almost quantitative reaction in the form of the 5-imino-1,2,4-triazines of Formula I. By hydrolysis, these 5-imino-1,2,4-triazines can, further, readily be converted into 1,2,4-triazine-5-ones. Since the α-iminonitriles required, for example 2-N-tert.-butylimino-3,3-dimethylbutyronitrile (cf. Chem. Ber. 1022, 1447 (1969)), are more readily accessible as starting materials than the appropriate α-ketonic acids, the process according to the invention exhibits considerable advantages compared with the process starting from α-ketonic acids. The present invention therefore represents a substantial enrichment of the art.

If 2-N-tert.-butylimino-3,3-dimethylbutyronitrile and thiocarbohydrazide hydrochloride are used as starting materials, the reaction course can be represented by the following formula scheme:

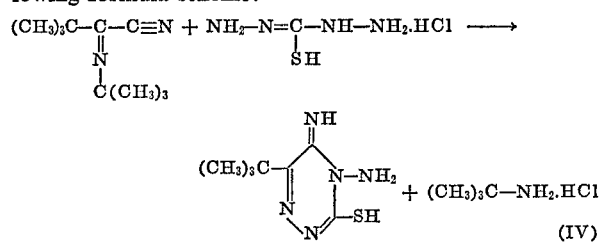

The α-iminonitriles used as starting materials are defined generally by Formula II.

R and $R_4$ stand preferably for alkyl with 1 to 10 carbon atoms, e.g., methyl, isopropyl, butyl, or decyl.

Some of the α-iminonitriles are known. They can be prepared either by dimerisation of isonitriles under the catalytic influence of Lewis acids such as boron trifluoride (cf. Ber. 102, 1447 (1969)) or by cationically catalysed reaction of isonitriles with nitriles (J. Org. Chem. 34, 4040–4046 (1969)). The compounds which are not yet known can be prepared according to the same methods.

As examples of the α-iminonitriles to be used according to the invention, reference may be made to the compounds described in the above-mentioned literature, and preferably those α-iminonitriles which can be prepared by dimerisation of the following tert.-alkylisonitriles: tert.-butylisonitrile, 1,1-dimethyl-propylisonitrile, 1,1,3,3-tetramethylbutylisonitrile, 1-methyl-1-cyclohexylisonitrile, 1-ethyl-1-cyclopentylisonitrile and 1-methyl-1-cyclooctylisonitrile.

The hydrazine derivatives used as starting materials are defined generally by Formula III.

The hydrazine derivatives of Formula III are known. As examples of the hydrazine derivatives which can be used according to the invention, there may be mentioned in particular: thiosemicarbazide, S-methyl-thiosemicarbazide, thiocarbohydrazide, S-methylthiocarbohydrazide, 4-methylthiosemicarbazide and carbohydrazide.

All inert polar organic solvents are suitable for use as the solvent. These include for example alcohols with 1–6 carbon atoms, preferably ethanol, as well as strongly polar solvents such as dimethyl sulphoxide, dimethyl formamide or hexamethylphosphoric acid triamide.

The presence of acidic catalysts is of importance in the reaction according to the invention.

Suitable acidic catalysts include for example Lewis acids such as boron trifluoride, aluminium chloride or tetrachloride; organic acids such as trifluoroacetic acid; and preferably inorganic acids, such as hydrochloric acid, nitric acid, sulphuric acid or phosphoric acid. It has proved particularly expedient to use the acid combined with the hydrazine derivative as salt.

The reaction temperatures can be varied within a fairly wide range. In general, the reaction is carried out at from −20° to +150° C., preferably 0° to 100° C.

In the carrying out of the process according to the invention, α-iminonitrile and hydrazine derivative are, in general, used in a molar ratio from 2:1 to 1:2, preferably in a ratio of approximately 1:1. The acid, with reference to the hydrazine derivative, is generally used in a molar ratio from 0.3:1 to 2:1, preferably in a ratio of approximately 1:1. In general, the reaction is begun at low temperatures, and heating to higher temperatures is then effected slowly. The working up may take place in customary manner for example by precipitation of the reaction products with water, filtration and recrystallization.

Moreover, the new 5-imino-1,2,4-triazine derivatives according to the invention also themselves exhibit strong herbicidal properties and can therefore be used for the control of weeds. The term "weeds" is used herein the widest sense to mean all plants which grow in places where they are not desired. Whether the active compounds according to the invention acts as total or selective herbicides depends chiefly on the amount used.

The active novel compounds of this invention can be used for example in the case of the following plants: dicotyledons, such as mustard (Sinapsis), cress (Lepidium), cleaver (Galium), common chickweed (Stellaria), camomile (Matricaria), smallflower (Galinsoga), fathen (Chenopodium), stinging nettle (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar-cane (Saccharum).

The active compounds of the invention can be converted into the usual formulations, such as solutions, emulsions, suspensions, powders, pastes and granulates. These may be produced in known manner, for example by mixing the active compound with extenders, that is, liquid or solid diluents or carriers, optionally with the use of surface-active agents, that is, emulsifying agents and/or dispersing agents. In the case of the use of water as an extender, organic solvents can for example also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulphoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include non-ionic and anionic emulsifiers, such as polyoxyethylene-fatty acid esters, polyoxyethylene-fatty alcohol ethers, for example, alkylarylpolyglycol ethers, alkyl sulphonates and aryl sulphonates; and preferred examples of dispersing agents include lignin, sulphite waste liquors and methyl cellulose.

The active compounds of the invention may be present in the formulations in admixture with other active compounds.

The formulations contain, in general, from 0.1 to 95, preferably from 0.5 to 90, percent by weight of active compound.

The active compounds of the invention may be used as such, or in the form of their formulations or of the application forms prepared therefrom, such as ready-to-use solutions, emulsions, suspensions, powders, pastes and granulates. Application may be effected in the usual manner, for example by spraying, squirting, scattering, dusting or watering.

The active compounds may be used in both the pre-emergence process and the post-emergence process. It is particularly expedient that the weeds be controlled in the early stage of development.

The invention also provides a herbicidal composition containing as active ingredient the compound of Formula I in admixture with solid diluent or carrier or in admixture with a liquid diluent or carrier containing a surface-active agent.

The invention also provides a method of combating weeds which comprises applying to the weeds or weed habitat the compound of Formula I alone or in the form of a composition containing as active ingredient the compound of Formula I in admixture with a solid or liquid diluent or carrier. The invention is illustrated by the following examples.

EXAMPLE A

Post-emergence test

Solvent: 5 parts by weight acetone
Emulsifier: 1 part by weight alkylaryl polyglycol ether To produce a suitable preparation of active compound, 1 part by weight of active compound is mixed with the stated amount of solvent, the stated amount of emulsifier is added and the concentrate is then diluted with water to the desired concentration.

Test plants which have a height of about 5–15 cm. are sprayed with the preparation of the active compound such a way, that the amount of active compound per unit area as given in the following table, is used. Depending on the concentration of the spraying liquor, the amount of water ranges from 1000–2000 l./ha. After three weeks, the degree of damage to the plants is determined and characterised by the values 0–5, which have the following meanings:

0 _____ No effect.
1 _____ A few slightly burnt spots.
2 _____ Marked damage to leaves.
3 _____ Some leaves and parts of stalks partially dead.
4 _____ Plant partially destroyed.
5 _____ Plant completely dead.

The active compounds, their concentrations and results obtained can be seen from the following table:

sifier was added and the concentrate was then diluted with water to the desired concentration.

Seeds of the test plants were sown in normal soil and, after 24 hours, watered with the preparation of the active compound. It was expedient to keep constant the amount of water per unit area. The concentration of the active compound in preparation was of no importance, only the amount of active compound applied per unit area being decisive. After three weeks, the degree of damage to the test plants was determined and characterised by the values 0–5, which have the following meaning:

0 _____ No effect.
1 _____ Slight damage or delay in growth.
2 _____ Marked damage or inhibition of growth.
3 _____ Heavy damage and only deficient development or only 50% emerged.
4 _____ Plants partially destroyed after germination or only 25% emerged.
5 _____ Plants completely dead or not emerged.

The active compounds, the amounts applied and the results obtained can be seen from the following table:

TABLE.—PRE-EMERGENCE-TEST

| Active compound | Amount of active compound applied, kg./ha. | Oats | Cotton | Wheat | Maize | Echino-chloa | Cheno-podium | Sinapis | Galin-soga | Stel-laria | Matri-caria | Lolium |
|---|---|---|---|---|---|---|---|---|---|---|---|---|
| t-C₄H₉—⟨triazine⟩—SCH₃, N—NH₂, NH  3-methylmercapto-4-amino-5-imino-6-tert.-butyl-1,2,4-triazine. | 10 | 4–5 | 4 | 4 | 4 | 5 | 5 | 5 | 5 | 5 | 5 | 4–5 |
| | 5 | 4–5 | 3–4 | 3–4 | 4 | 5 | 4–5 | 5 | 5 | 5 | 5 | 4 |
| | 2.5 | 3 | 3 | 2 | 3–4 | 4 | 4–5 | 4 | 5 | 5 | 4–5 | 3 |
| | 1.25 | 2 | 1 | 1 | 2 | 3 | 4 | 4 | 5 | 5 | 4–5 | 1 |
| | 0.625 | 1 | 1 | 0 | 1 | 3 | 2 | 1 | 4 | 4–5 | 4–5 | 0 |
| | 0.3125 | 1 | 0 | 0 | 0 | 2 | 1 | 0 | 3 | 2 | 2 | 0 |

EXAMPLE 1

Preparation of 3-mercapto-4-amino-5-imino-6-tert.-butyl-1,2,4-triazine

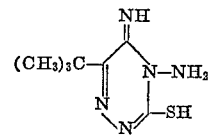

(V)

142.5 g. (1 mole) thiocarbohydrazide hydrochloride were dissolved in 500 ml. dimethyl sulphoxide and reacted in one hour with 166 g. (1 mole) 2-tert.-butylimino-3,3-dimethylbutyronitrile, with cooling to 20° C. Stirring was

TABLE.—POST-EMERGENCE-TEST

| Active compound | Amount of active compound applied, kg./ha. | Oats | Cotton | Wheat | Beans | Echino-chiloa | Cheno-podium | Sinapis | Galin-soga | Stel-laria | Urtica | Matri-caria | Daucus |
|---|---|---|---|---|---|---|---|---|---|---|---|---|---|
| t-C₄H₉—⟨triazine⟩—SCH₃, N—NH₂, NH  3-methylmercapto-4-amino-5-imino-6-tert.-butyl-1,2,4-triazine. | 2 | 4–5 | 5 | 5 | 5 | 5 | 5 | 5 | 5 | 5 | 5 | 5 | 5 |
| | 1 | 4–5 | 5 | 4–5 | 5 | 5 | 5 | 5 | 5 | 5 | 5 | 5 | 5 |
| | 0.5 | 4 | 5 | 2 | 5 | 5 | 5 | 5 | 5 | 5 | 5 | 4 | 5 |
| | 0.25 | 3 | 5 | 0 | 4–5 | 5 | 5 | 4–5 | 5 | 5 | 5 | 3 | 2 |
| | 0.125 | 2 | 0 | 0 | 3 | 4 | 5 | 4–5 | 5 | 4 | 5 | 0 | 1 |

EXAMPLE B

Pre-emergence test

Solvent: 5 parts by weight acetone
Emulsifier: 1 part by weight alkylaryl polyglycol ether To produce a suitable preparation of active compound, 1 part by weight of active compound was mixed with the stated amount of solvent, the stated amount of emulafterwards effected for one hour before the reaction product was precipitated with 1 litre of ice water. After recrystallization from ethanol, 3-mercapto-4-amino-5-imino-6-tert.-butyl-1,2-4-triazine of the melting point 181° C. was obtained.

Yield: 150 g. (75% of the theory).

The following Table 1 shows the yields of 3-mercapto-4 - amino - 5 - imino-6-tert.-butyl-1,2,4-triazine when the same reaction was carried out using various solvents, temperatures and catalysts:

TABLE 1

| Solvent | Temp., °C./time, hours | Catalyst (1 molar equivalent) | Yield, percent | M.P., °C. |
|---|---|---|---|---|
| Ethyl alcohol | 20°/1 hour plus 90°/1 hour | HCl (as salt) | 80 | 179–181 |
| Dimethyl formamide | do | do | 50 | 178–180 |
| Dimethyl sulphoxide | 20°/2 hours | HNO₃ (as salt) | 51 | 179–180 |
| Do | 20°/1 hour | BF₃-O(C₂H₅)₂ | 12 | 179–180 |
| Do | do | CF₃-COOH | 30 | 178–180 |

(a) Hydrolysis:

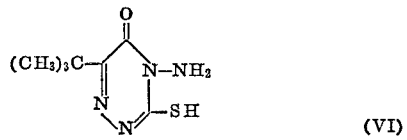

(VI)

10 parts by weight 3-mercapto-4-amino-5-imino-6-tert.-butyl-1,2,4-triazine were heated to 100° C. for 2 hours with 80 parts by weight ethanol and 100 parts by weight 1-normal hydrochloric acid. After cooling to 20° C., the crystalline reaction product separated, was filtered off with suction and was dried. There were obtained 9.3 parts by weight 3 - mercapto-4-amino-6-tert.-butyl-1,2,4-triazine-5-one of the melting point 215–217° C.

Yield: 93% of the theory.

This hydrolysis can also be carried out in a one-pot process immediately following the reaction of 2-tert.-butyl-imino - 3,3 - dimethylbutyronitrile with thiocarbohydrazide hydrochloride without intermediate isolation of the 3 - mercapto - 4-amino-5-imino-6-tert.-butyl-1,2,4-triazine.

(b) Methylation:

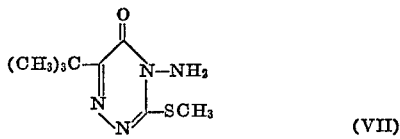

(VII)

4 parts by weight 3-mercapto-4-amino-6-tert.-butyl-1,2,4-triazine-5-one were dissolved in a mixture of 11 parts by weight 2-normal sodium hydroxide solution and 4 parts by weight methanol, and 3.2 parts by weight methyl iodide were added at 0° C. The reaction mixture was subsequently stirred at 20° for a further 4 hours. The reaction product crystallized out, was filtered off with suction, dried and recrystallized from benzene. There were obtained 3.52 parts by weight 3-methylmercapto-4-amino-6-tert.-butyl-1,2,4-triazine-5-one of the melting point 126–127° C.

Yield: 82% of the theory.

EXAMPLE 2

Preparation of 3-methylmercapto-4-amino-5-imino-6-tert.-butyl-1,2,4-triazine-5-one

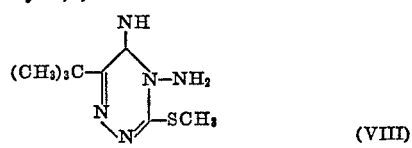

(VIII)

Analogously with Example 1, using S-methylthiocarbohydrazide hydrochloride, there was obtained 3-methylmercapto-4-amino-5-imino-6-tert.-butyl-1,2,4 - triazine of the melting point 154–155° C.

The same product can be prepared by direct methylation of the 3-mercapto-4-amino-6-tert.-butyl-1,2,4-triazine described in Example 1, as follows:

4 parts by weight 3-mercapto-4-amino-5-imino-6-tert.-butyl-1,2,4-triazine were dissolved in a mixture of 11 parts by weight 2-normal sodium hydroxide solution and 4 parts by weight methanol and, possibly after filtering off a little undissolved matter, 3.2 parts by weight methyl iodide were added at 20° C. The reaction mixture was subsequently stirred at 20° C. for further 4 hours. The reaction product crystallized out, was filtered off with suction and was dried. There were obtained 3.8 parts by weight (89% of the theory) 3-methylmercapto-4-amino-5 - imino - 6 - tert.-butyl-1,2,4-triazine of the melting point 152–154° C. If the intermediate isolation of 3-mercapto-4-amino-5-imino-6-tert.-butyl-1,2,4-triazine was dispensed with the methylation described above can also be carried out in a one-pot method.

7.1 parts by weight thiocarbohydrazide hydrochloride and 8.3 parts by weight 2-tert.-butylimino-3,3-dimethyl-butyronitrile were stirred for 1 hour at room temperature in 5 parts by weight dimethyl sulphoxide. 5 parts by weight 2-normal sodium hydroxide solution were then added, brief evacuation was effected, and 8.5 parts by weight methyl iodide were added at 0° C. The reaction product crystallized out, was filtered off with suction and was recrystallized from ethanol. There were obtained 4.4 parts by weight 3-methylmercapto-4-amino-5-imino-6-tert.-butyl-1,2,4-triazine of the melting point 154–155° C. Yield: 41% of the theory.

EXAMPLE 3

Preparation of 3-hydroxy-4-amino-5-imino-6-tert.-butyl-1,2,4-triazine

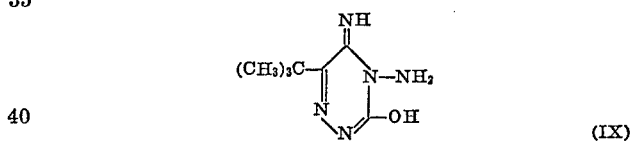

(IX)

166 parts by weight 2-tert.-butylimino-3,3-dimethylbutyronitrile and 126 parts by weight carbohydrazide hydrochloride were heated to 100° C. for 1 hour in 400 parts by weight dimethyl sulphoxide. From the clear solution, 195 parts by weight of colourless substance were precipitated with water. After recrystallization from ethyl alcohol, 98 parts by weight (53% of the theory) 3-hydroxy-4-amino-5-imino-6-tert.-butyl-1,2,4-triazine of the melting point 182–184° C. were obtained.

EXAMPLE 4

Preparation of 3-mercapto-4-methyl-5-imino-6-tert.-butyl-1,2,4-triazine

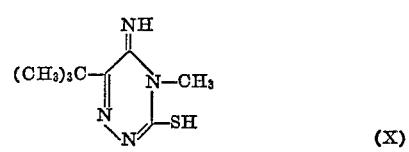

(X)

166 parts by weight 2-tert.-butylimino-3,3-dimethylbutyronitrile and 141 parts by weight 4-methylthiosemicarbazide hydrochloride were heated to 100° C. for one hour in 400 parts by weight dimethyl sulfoxide. After precipitation of the reaction product with water and recrystallization from alcohol, there were obtained 62 parts by weight (31% of the theory) 3-mercapto-4-methyl-5-imino-6-tert.-butyl-1,2,4-triazine of the melting point 170–172° C.

It will be understood that the specification and examples are illustrative but not limitative of the present invention and that other embodiments within the spirit and scope of the invention will suggest themselves to those skilled in the art.

What is claimed is:

1. 5-imino-1,2,4-triazine compound of the formula

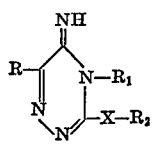

in which

R is alkyl of from 1 to 10 carbon atoms,
R₁ is alkyl of from 1 to 6 carbon atoms or amino,
R₂ is hydrogen or alkyl of from 1 to 6 carbon atoms, and
X is oxygen or sulfur.

2. Compound as claimed in claim 1 wherein X is oxygen.
3. Compound as claimed in claim 1 wherein X is sulfur.
4. Compound as claimed in claim 1 wherein said compound is designated as 3-methylmercapto-4-amino-5-imino-6-tert.-butyl-1,2,4-triazine.
5. Compound as claimed in claim 1 wherein said compound is designated as 3-mercapto-4-amino-5-imino-6-tert.-butyl-1,2,4-triazine.
6. Compound as claimed in claim 1 wherein said compound is designated as 3-hydroxyl-4-amino-5-imino-6-tert.-butyl-1,2,4-triazine.
7. Compound as claimed in claim 1 wherein said compound is designated as 3-mercapto-4-methyl-5-imino-6-tert.-butyl-1,2,4-triazine.
8. Process for the production of a 5-imino-1,2,4-triazine compound of the formula

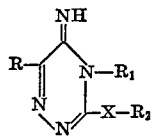

in which

R is alkyl of from 1 to 10 carbon atoms,
R₁ is alkyl of from 1 to 6 carbon atoms or imino,
R₂ is hydrogen or alkyl of from 1 to 6 carbon atoms, and
X is oxygen or sulfur;

which process comprises reacting an α-iminonitrile of the formula

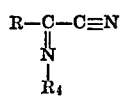

in which R is defined as above and R₄ is alkyl of from 1 to 10 carbon atoms;

with a hydrazine compound of the formula

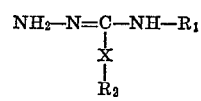

in which R₁, R₂ and X are defined as above, in the presence of an organic solvent and in the presence of an acid.

9. Process as claimed in claim 8 in which the reaction is carried out at a temperature of from about −20° C. about 150° C.
10. Process as claimed in claim 9 wherein the reaction temperature is between 0 and 100° C.
11. Process as claimed in claim 8 in which said solvent is ethyl alcohol, dimethyl sulfoxide or dimethyl formamide.
12. Process as claimed in claim 8 in which said hydrazine compound is in the form of its hydrochloride.
13. Process as claimed in claim 8 wherein the molar ratio of said α-iminonitrile to said hydrazine compound is from 2:1 to 1:2.
14. Process as claimed in claim 13 wherein said molar ratio is about 1:1.
15. Process as claimed in claim 8 wherein the molar ratio of said acid to said hydrazine compound is from 0.3:1 to 2:1.
16. Process as claimed in claim 15 wherein said molar ratio is about 1:1.
17. Process as claimed in claim 8 wherein said acid is trifluoroacetic acid.
18. Process as claimed in claim 8 is carried out in the presence of boron trifluoride etherate.

References Cited

UNITED STATES PATENTS 3,586,680   6/1971   Meiser et al. _____ 260—249.5

JOHN M. FORD, Primary Examiner

U.S. Cl. X.R.

71—93; 260—249.9